United States Patent [19]

Reinnagel et al.

[11] Patent Number: 5,194,720
[45] Date of Patent: Mar. 16, 1993

[54] METHOD AND APPARATUS FOR PERFORMING ON-LINE INTEGRATED DECODING AND EVALUATION OF BAR CODE DATA

[75] Inventors: Alan R. Reinnagel, Henrietta; Lucas P. Curtis, Rochester, both of N.Y.

[73] Assignee: Eastman Kodak Company, Rochester, N.Y.

[21] Appl. No.: 691,278

[22] Filed: Apr. 25, 1991

[51] Int. Cl.⁵ .................... G06K 5/00; G06K 7/10
[52] U.S. Cl. ................... 235/437; 235/462; 235/463; 250/568
[58] Field of Search ............ 235/437, 462, 463; 364/555.01; 356/71, 72; 250/568

[56] References Cited

U.S. PATENT DOCUMENTS

| | | | |
|---|---|---|---|
| 3,961,164 | 6/1976 | Reed et al. | 235/495 X |
| 4,027,142 | 5/1977 | Paup et al. | 235/487 X |
| 4,160,901 | 7/1979 | Nakanishi et al. | 235/437 |
| 4,224,508 | 9/1980 | Kao | 235/437 |
| 4,440,248 | 4/1984 | Teraoka | 177/4 |
| 4,449,052 | 5/1984 | Krieg | 250/568 |
| 4,463,250 | 7/1984 | McNeight et al. | 235/385 |
| 4,608,489 | 8/1986 | Ramsey et al. | 235/462 |
| 4,646,353 | 2/1987 | Tenge et al. | 382/12 |
| 4,652,730 | 3/1987 | Marshall | 235/436 |
| 4,661,001 | 4/1987 | Takai et al. | 400/103 |
| 4,671,661 | 6/1987 | Ott | 235/454 X |
| 4,736,315 | 4/1988 | Ozaki et al. | 902/1 X |
| 4,758,717 | 7/1988 | Shepard et al. | 235/472 |
| 4,860,226 | 8/1989 | Martin et al. | 364/552 |
| 4,868,375 | 9/1989 | Blanford | 235/462 |
| 4,914,709 | 4/1990 | Rudak | 382/57 |
| 4,916,298 | 4/1990 | Raphaël | 235/463 |

FOREIGN PATENT DOCUMENTS 0404412 12/1990 European Pat. Off. .

*Primary Examiner*—John W. Shepperd
*Assistant Examiner*—Edward Sikorski
*Attorney, Agent, or Firm*—Dennis R. Arndt

[57] ABSTRACT

A method and apparatus for on-line evaluation of bar code symbol quality is disclosed in which bar code decoding and evaluation functions are integrated within a single unit. The integration of the bar code decoding and evaluation functions results in significantly more conclusive analysis of the quality of the bar code symbols as the analysis methodology and decoding process utilize a common scanning device. Thus, the ambiguities associated with hardware differernces between the decoding apparatus and stand alone bar code verifiers in evaluating the quality of the bar code symbols associated with conventional evaluation techniques are eliminated.

4 Claims, 4 Drawing Sheets

METHOD AND APPARATUS FOR PERFORMING ON-LINE INTEGRATED DECODING AND EVALUATION OF BAR CODE DATA

FIELD OF THE INVENTION

The invention relates generally to systems that process or decode items, such as documents, packages, components, etc., that are optically encoded with bar code symbols. More specifically, the invention provides for the integration of bar code decoding and bar code evaluation functions within a single unit, in order to provide on-line bar code evaluation in a device whose fundamental operation is the decoding of the bar code symbols for data collection purposes.

BACKGROUND OF THE INVENTION

The use of bar code symbols to encode identification parameters for a variety of items has become commonplace. Bar code symbols are used, for example, to encode product identification and price information for consumer goods, part numbers and manufacturing lot numbers for machine parts, and identification codes for documents. The bar code symbols are usually attached to the item to be encoded through the use of a pre-printed label, directly printed on the item itself, or printed on material used to package the item.

The variety of printing methods utilized to generate the bar code symbols, for example dot-matrix, ink-jet or offset printing, can cause a problem for equipment designed to read or decode the symbols. Different printing techniques can cause differences in optical characteristics, such as the reflectance, as well as physical characteristics, such as the width, of the elements of the printed bar code symbols. The same printing method can also yield various quality results due to variables associated with the printing process. Thus, two printed symbols that appear identical to the human eye may not be similarly interpreted by equipment designed to decode the symbols, i.e., the decoding equipment may be able to properly interpret the first bar code symbol but may not be able to interpret the second bar code symbol as a result of the above-described differences.

Standards have been developed to insure that bar code symbols are printed to exhibit uniform characteristics when decoded. ANSI Specification "Bar Code Print Quality" X3.182-1990, for example, defines a method of grading the quality of printed bar code symbols. In theory, a bar code symbol printed to a specific standard should be capable of being universally read by different decoding devices designed to decode bar code symbols printed to the standard. In practice, however, the inability to monitor the quality of the bar codes symbols on-line, i.e. as they are being read by the decoding apparatus, causes difficulties when one is trying to evaluate whether a decoding error was caused by a poor quality bar code symbol or by a decoding equipment malfunction.

Traditionally, a stand alone dedicated bar code verifiers, such as the QUICK CHECK 5 manufactured by Photographic Sciences Corporation of Webster, New York or the INSPECTOR II manufactured by RJS Inc. of Monrovia, California, have been employed to verify the quality of a bar code symbol when the decoding apparatus indicates that the bar code symbol is unreadable or unrecognizable. The dedicated bar code verifier, however, may utilize a different analysis methodology and decoding process—including different illumination wavelengths and measuring apertures—than the decoding apparatus being employed to read the bar code symbol. Thus, the data produced by the dedicated bar code verifier may not correspond to the data produced by the decoding apparatus which causes further difficulties when attempting to isolate the source of a decoding error, namely, one is faced with finding a way to correlate the data produced by the bar code verifier with the data produced by the decoding apparatus and resolving any differences.

The problems associated with the mismatch in processing techniques and hardware between the decoding apparatus and a stand alone bar code verifier is further exasperated when a marginal quality bar code symbol is under evaluation. The decoding apparatus may reject the marginal bar code symbol, for example, while the stand alone bar code verifier may accept the marginal bar code symbol or the reverse situation may occur. An operator may then decide to analyze a sample "known good" bar code symbol to determine whether the decoding apparatus or the stand alone verifier is providing correct data. Both devices, however, may indicate that the sample bar code symbol is acceptable. The operator is then left in a quandary, unable to determine which device is accurately representing the quality of the bar code symbol. This situation can cause a great deal of frustration for the operator who cannot determine whether the bar code symbol printing quality or a decoding equipment malfunction is causing the decoding errors.

In view of the above, it would be desirable to provide a method and apparatus that is capable of evaluating the quality of bar code symbols on-line, i.e. as the symbols are decoded, thereby avoiding the problems associated with the use of a stand alone bar code verifiers.

SUMMARY OF THE INVENTION

The present invention overcomes the difficulties associated with determining the source of a decoding error by providing a method and apparatus for on-line evaluation of bar code symbol quality in which bar code decoding and evaluation functions are integrated within a single unit. The integration of the bar code decoding and evaluation functions results in significantly more conclusive analysis of the quality of the bar code symbols as the analysis methodology and decoding process utilize a common scanning device. Thus, the ambiguities associated with hardware differences between the decoding apparatus and a stand alone bar code verifier in evaluating the quality of the bar code symbols associated with conventional evaluation techniques are eliminated.

In a preferred embodiment, a decode and evaluation apparatus is provided that include a bar code symbol scanning unit, a decode/evaluation processing unit coupled to the bar code symbol scanning unit, an operator control panel coupled to the decode/evaluation processing unit, and a display unit coupled to the decode/evaluation processing unit. In operation, digitized bar code symbol data generated by the bar code scanning unit is supplied to the decode/evaluation processing unit. The decode/evaluation processing unit performs either a decode operation or an evaluation operation on the digitized bar code data in response to control signals received from the operator control panel.

BRIEF DESCRIPTION OF THE DRAWINGS

With the above as background, reference should now be made to the detailed description of the preferred embodiment of the invention provided below along with the accompanying drawings in which.

DETAILED DESCRIPTION OF THE PREFERRED EMBODIMENT

The invention will be described with reference to its implementation in a high speed document scanning device that incorporates an integrated bar code decoding/evaluation feature. It will be understood, however, that the invention is applicable to any type of bar code decoding apparatus and is not limited to the specific application set forth and described below.

Figure 1:
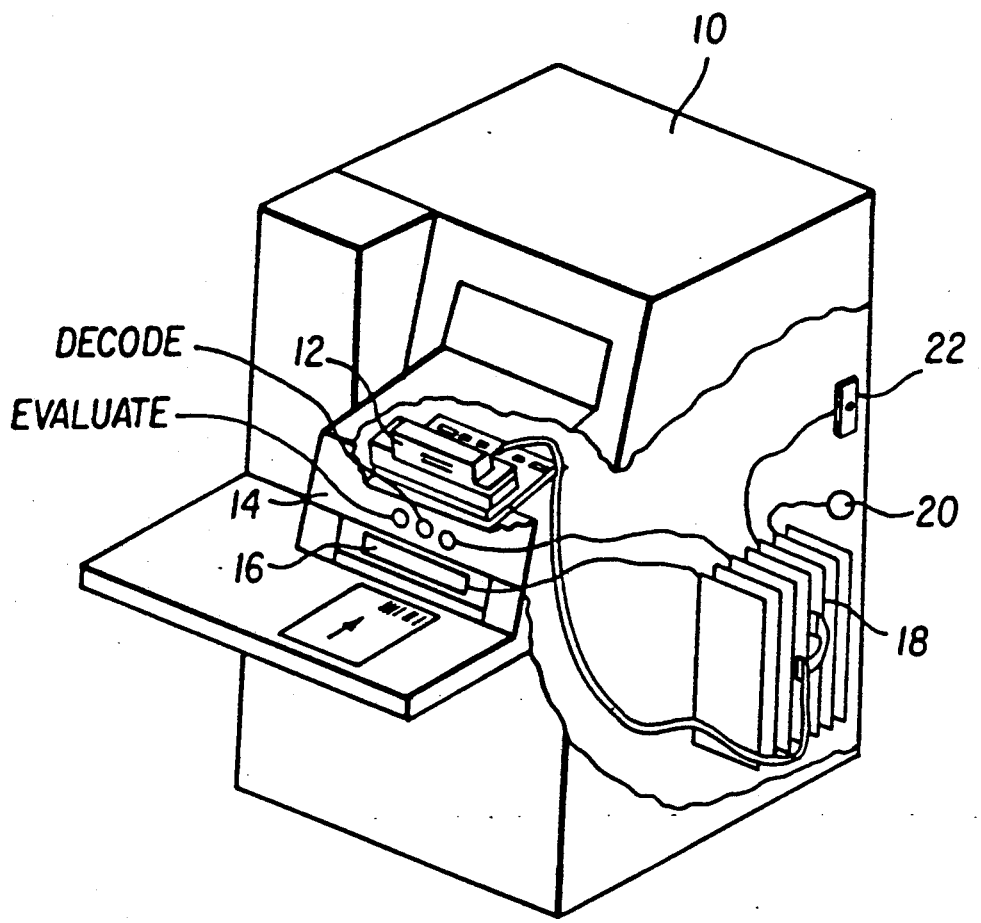
FIG. 1 illustrates a document scanning device incorporating the present invention.

A document scanning device 10, for example an IMAGELINK MICROIMAGER 70 manufactured by the Eastman Kodak Company, incorporating an integrated bar code decoding/evaluation feature is shown in FIG. 1. The document scanning device 10 includes an internal transport mechanism that feeds documents past a bar code scanning unit 12, an operator control panel 14 including a "Decode" switch and an "Evaluate" switch, an evaluation display 16, decode/evaluation processing unit 18 coupled to the bar code scanning unit 12, a decoded data output port 20, and an evaluation data output port 22. The document scanning device 10 also includes conventional scanning circuitry to scan the documents and provide digitized document data and/or a conventional microfilmer unit to record the document image on film.

The bar code scanning unit 12 includes a contact-type CCD linear image sensor array, for example a TCD120AC sensor manufactured by Toshiba Corporation containing 4800 photodiodes which provides a 400 dot/inch resolution across A3 size paper, that is used to digitize a bar code symbol printed on a document as it is transported past the bar code scanning unit 12. The bar code scanning unit 12 effectively takes a "snapshot" of the bar code with the linear image sensor array and provides a digital data representation of the bar code symbol to the decode/evaluation processing unit 18. It will be understood that while a linear image sensor array is employed to digitize the bar code symbol in the illustrated embodiment, other types of bar code scanning techniques, for example scanning light beams, may also be employed to generate a digital representation of the bar code symbol.

Figure 2:
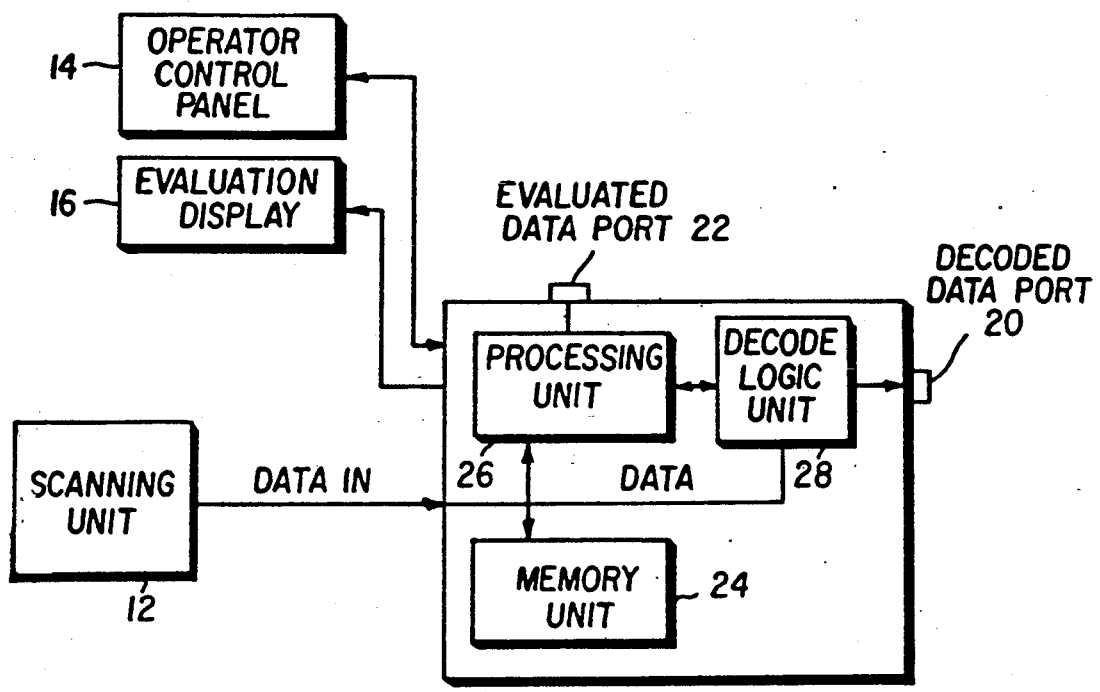
FIG. 2 is a schematic block diagram of the decode/evaluation processing unit employed in the document scanning device illustrated in FIG. 1.

As shown in FIG. 2, the decode/evaluation processing unit 18 includes a memory unit 24, a processor unit 26, and a decode logic unit 28. The processor unit 26 is coupled to the operator control panel 14 and to the evaluation display 16. The digital data representing the scanned bar code symbol is received from the bar code scanning unit 12 and stored in the memory unit 24 under control of the processor unit 26. Once the digital data has been received, the processor unit 26 initiates either a decoding operation or an evaluation operation in response to signals received from the operator control panel 14.

For example, in a normal running mode of operation, an operator activates the "Decode" switch on the operator control panel 14 and documents containing printed bar code symbols are fed past the bar code scanning unit 12 by the transport mechanism. The bar code scanning unit 12 supplies digital data representative of the bar code symbols to the memory unit 24. The processor unit 26 supplies the stored digitized bar code data to the decode logic unit 28 in response to the activation of the "Decode" switch. The decode logic unit 28 utilizes conventional decoding techniques, implemented either in hardware or software, to match a decoded character word with a valid pattern for a character set of a particular type of bar code (for example Code 39, Interleaved 2 of 5, Codabar, etc.) and returns an ASCII value for the decoded character to the decoded data port 20 and/or the processor unit 26. The decoded data port 20 is coupled to an external computer that monitors the documents being processed via the data received from the decoded data output port 20. The decode logic unit 28 returns an error signal to the processor unit 26 if it is unable to locate a match for the decoded character word with a valid pattern.

Upon receipt of the error signal from the decode logic unit 28, the processor unit 26 displays an error message on the evaluation display 16 to inform the operator of the error. The operator may then switch to an evaluation mode of operation by activating the "Evaluate" switch on the operator control panel 14. The processor unit 26 enters the evaluation mode of operation in response to the activation of the "Evaluate" switch to evaluate a number of bar code symbol parameters and assign a alpha value (A-F) grade to the bar code symbol under evaluation in accordance with the ANSI standard specification. The ANSI specification defines a variable called "Symbol Grade" to indicate bar code symbol readability based on the printed bar code symbol parameters that affect readability. The individual printing parameters received individual grades called "Parameter Grades" that are used to calculate the overall Symbol Grade. The ANSI parameters to be evaluated include:

MINIMUM REFLECTANCE—the least amount of light that is returned from any bar expressed as a percentage;

SYMBOL CONTRAST (SC)—the difference between the MINIMUM light REFLECTED (Rmin) and the maximum light reflected (Rmax) expressed as a percentage (SC=Rmax -Rmin);

MINIMUM EDGE CONTRAST (ECmin)—The smallest edge contrast within the symbol between any adjoining spaces (Rs) and bars (Rb).

MODULATION (MOD)—a ratio which divides the minimum contrast between any adjoining spaces (Rs) and bar (Rb) within the symbol by the overall symbol contrast (SC) and is used to indicate the range of contrast within the bar code symbol and identify density continuity problems (MOD=ECmin/SC); and DEFECT RATIO (DR)—which looks at the maximum contrast change within any element (bar, space or quiet zone) and divides it by the overall symbol contrast in order to identify the amount of reflected "noise" or undesirable changes in reflectance (DR = Element Reflectance Nonuniformity (ERN)/SC).

In addition to the five ANSI reflectance parameters listed above, it is also desirable to provide a reading of:

MINIMUM NARROW ELEMENT WIDTH (WNmin)—the thickness or width of the most narrow bar or space as measured from its leading to trailing edge along the scan plane; and WIDTH TO NARROW RATIO (R)—the average width of the wide elements divided by the average width of the narrow elements (wherein the elements may be either bars or spaces).

Figure 3:
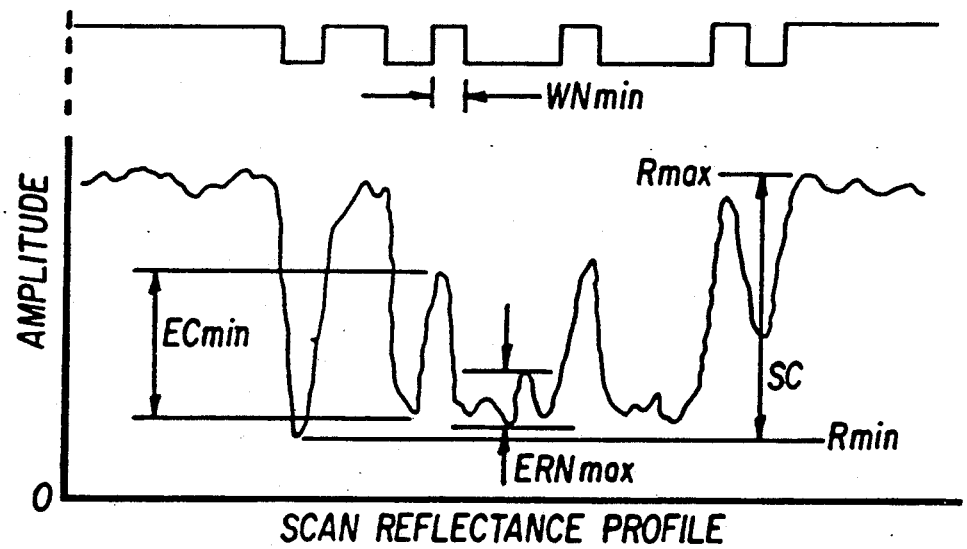
FIG. 3 illustrates a typical scan reflectance profile for a scanned bar code symbol.

An example of a typical scan reflectance profile reflecting the above-identified parameters is illustrated in FIG. 3. The Symbol Grade can be displayed in either a number of letter form as shown in Table 1. Table 2 illustrates the criteria for assigning geometry Parameter Grades. Table 3 illustrates the criteria for assigning reflectance parameter grades.

TABLE 1

Symbol Grade Conversion $3.5 \leq A \leq 4.0$
$2.5 \leq B < 3.5$
$1.5 \leq C < 2.5$
$0.5 \leq D < 1.5$
$F < 0.5$

TABLE 2

| | Geometry Parameter Grades | | |
|---|---|---|---|
| Grade | WNmin | WNmin ≥ 0.020 inch | WNmin < 0.020 inch |
| A | ≥0.010 inch | R ≥ 2:1 | R ≥ 2.2:1 |
| F | <0.010 inch | R < 2:1 | R < 2.2:1 |

TABLE 3

| | Reflectance Parameter Grades | | | | |
|---|---|---|---|---|---|
| Grade | Rmin/Rmax | SC | Ecmin | MOD | DR |
| A | ≤0.5 | ≥70% | ≥15% | ≥0.70 | ≤0.15 |
| B | | ≥55% | | ≥0.60 | ≤0.20 |
| C | | ≥40% | | ≥0.50 | ≤0.25 |
| D | | ≥20% | | ≥0.40 | ≤0.30 |
| F | >0.5 | <20% | <15% | <0.40 | >0.30 |

Figure 4:
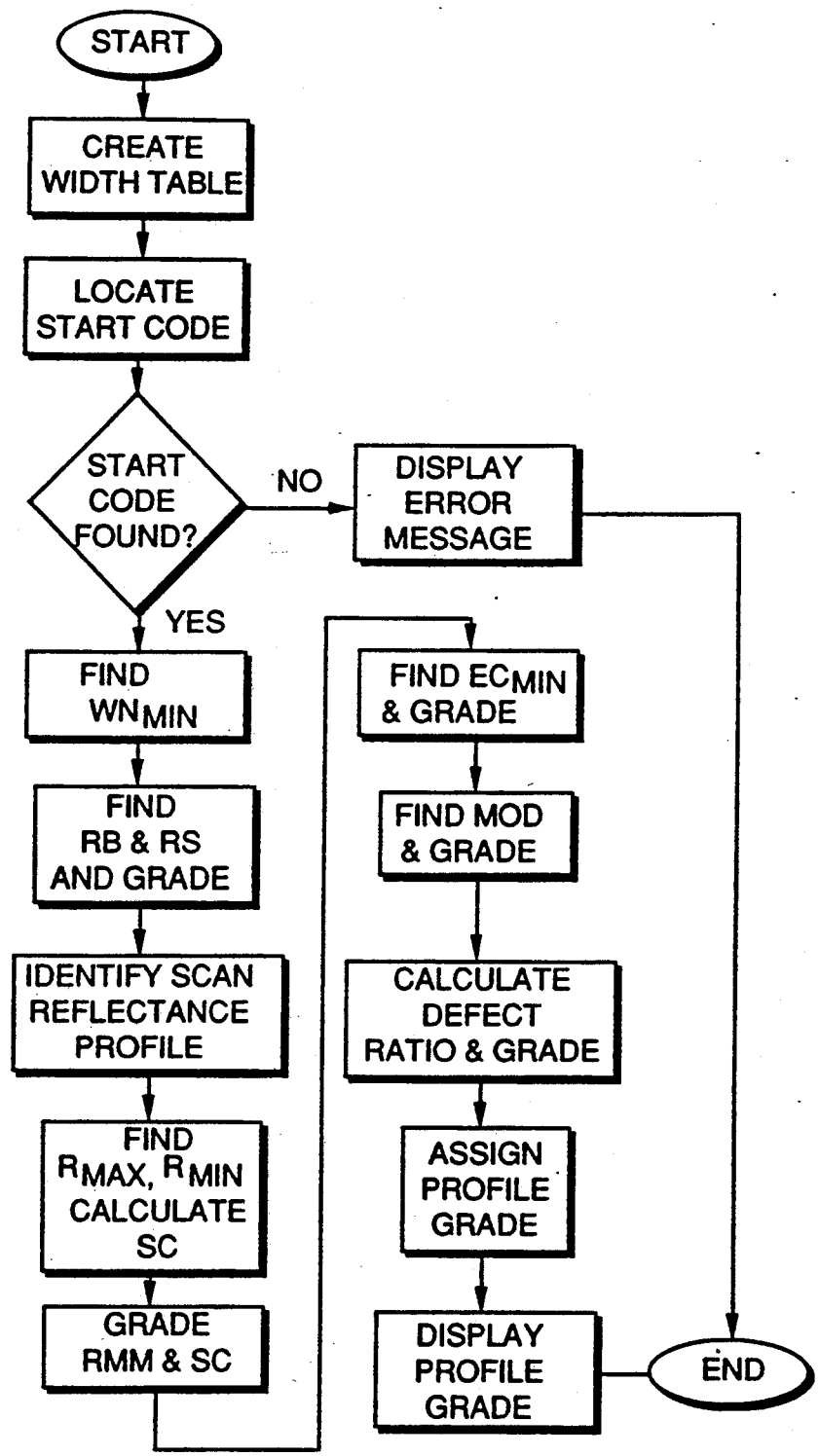
FIG. 4 is a flow diagram of the operation of a processor unit of the decode/evaluation processing unit illustrated in FIG. 2 during an evaluation routine.

A flowchart illustrating the evaluation routine performed by the processor unit 26 is shown in FIG. 4. The processing unit 26 creates a width table by counting the number of black or white pixels between each edge (transitions from 0 to 1 or 1 to 0) and storing these values in the table along with the position of each edge. Next, the processor unit 26 attempts to find a start code for the type of bar code symbol being processed and marks the position of the start code in the width table. If no start code is found, the processor unit 26 displays a "No Bar Code Found" message on the evaluation display 16. The processor unit 26 continues to decode each character of the bar code symbol under evaluation if a start code is found until a stop code is reached or an invalid character is found. At this point, the processor unit 26 finds the smallest narrow element width (WNmin) in the width table starting with the start character and ending with the stop character or the last valid character decoded, and grades WNmin based on the criteria provided in Table 2. The processor unit 26 then proceeds to find the average width to narrow ratio for bars (RB) and the average width to narrow ratio for spaces (RS) using the width table, and uses the criteria provided in Table 2 to grade the smaller of the two values, i.e. the smaller of RS or RB is used for the ratio R in Table 2. The scan reflectance profile is then identified starting 0.25 inches (100 pixels) before the start character and ending 0.25 inches (100 pixels) past the stop character. The scan reflectance profile ends at the position of the first invalid character if the bar code symbol could only be partially read. The processor unit 26 then finds the maximum reflectant (Rmax) and the minimum reflectance (Rmin) in the scan reflectance profile, calculates the symbol contrast (SC), and determines the parameter grades for Rmin/Rmax and SC based on the criteria provided in Table 3. Next, the edge contrast is determined for each edge based on the maximum reflectance of the white elements minus the minimum reflectance of the black elements and the smallest edge contrast is identified as the minimum edge contrast (ECmin) which is also graded based on the criteria provided in Table 3. The modulation (MOD) is then determined based on the minimum edge contrast (ECmin) and the symbol contrast (SC) and parameter graded as indicated in Table 3. Finally, the defect ratio (DR) is determined by finding the element reflectance nonuniformity (ERN) for each element and quiet zone and dividing the maximum element reflectance nonuniformity (ERNmax) by the symbol contrast (SC). The defect ratio is also parameter graded based on the criteria in Table 3. After completion of the parameter grading, the processor unit 26 assigns an overall profile grade based on the lowest of the seven parameter grades. The results can be displayed on the evaluation display 16 and/or sent to a service computer attached to the evaluation data output port 22.

The overall profile grade is indicative of the quality of the bar code symbol data generated by the document scanning device 10 during a normal dynamic running mode of operation. If the evaluation process indicates that the bar code symbol data is of good quality, it can be assumed that the bar code symbol is within acceptable parameters and a malfunction has occurred within the decode logic unit 28 which caused the bar code reading error. If the evaluation process indicates that the bar code symbol data is of poor quality, a further static test can be run to determine if the bar code symbol is actually of poor quality or if a problem exists with the transport mechanism or bar code scanning unit that is causing the decoding error.

The static test is run by manually placing the document under the bar code scanning unit and activating the processing unit 26 to perform the evaluation routine. The document is kept stationary while the evaluation routine is being run. Thus, any adverse effects of the transport mechanism on the bar code symbol reading process are avoided. If the static test indicates that the bar code symbol is of acceptable quality when it was previously unacceptable in the dynamic test, it can be assumed that the decoding error is a transport related problem.

If both the static and dynamic tests indicate that the bar code symbol is of unacceptable quality, a further calibration test using a known good bar code can be performed to insure the unacceptable reading is not related to a problem with the scanning unit or the decode/evaluation unit. If the evaluation of the known good bar code is correct, the operator knows that the bar code symbol is in fact of unacceptable quality.

It should be noted that the ANSI standard specifies that a minimum of ten overall profile grades should be taken using different scans through the inspection band (the inspection band is the area of the bar code symbol spanning 10% to 90% of the bar code height), and the results averaged to determine an actual Symbol Grade for the bar code symbol. Thus, the static test should be repeated and the results averaged if a Symbol Grade for the bar code symbol is desired.

The integration of the bar code decoding and bar code evaluation functions within a single unit eliminates the ambiguities associated with the use of stand alone bar code verifiers. Stand alone bar code verifiers are also limited to providing a static test of the bar code symbol quality. The invention provides the ability to run a static test as well as a dynamic test. The dynamic test is more useful in taking into account document transport variables on the readability of the bar code symbols. In addition, the invention provides the ability to effectively grade the quality of the bar code symbols.

The invention has been described with reference to certain preferred embodiments thereof. It will be understood, however, that modifications and variations are possible within the scope of the appended claims. For example, although it would be preferable to store the digitized bar code data while running in the normal mode of operation so that an evaluation of the actual data obtained during the running mode can be performed as described above, the desirability for high speed operation and hardware limitations may not permit the storing of the digitized data for subsequent analysis. In such a case, the digitized bar code data would be supplied directly to the decode logic unit 28 for decoding. If a decoding error occurs, the operator would then be required to switch to the evaluation mode of operation and either re-run the document through the transport mechanism to perform a dynamic test of the failed bar code symbol or perform a static test of the bar code symbol, in which case the digitized data would be supplied directly to the processor unit 26 for evaluation.

Figure 5:
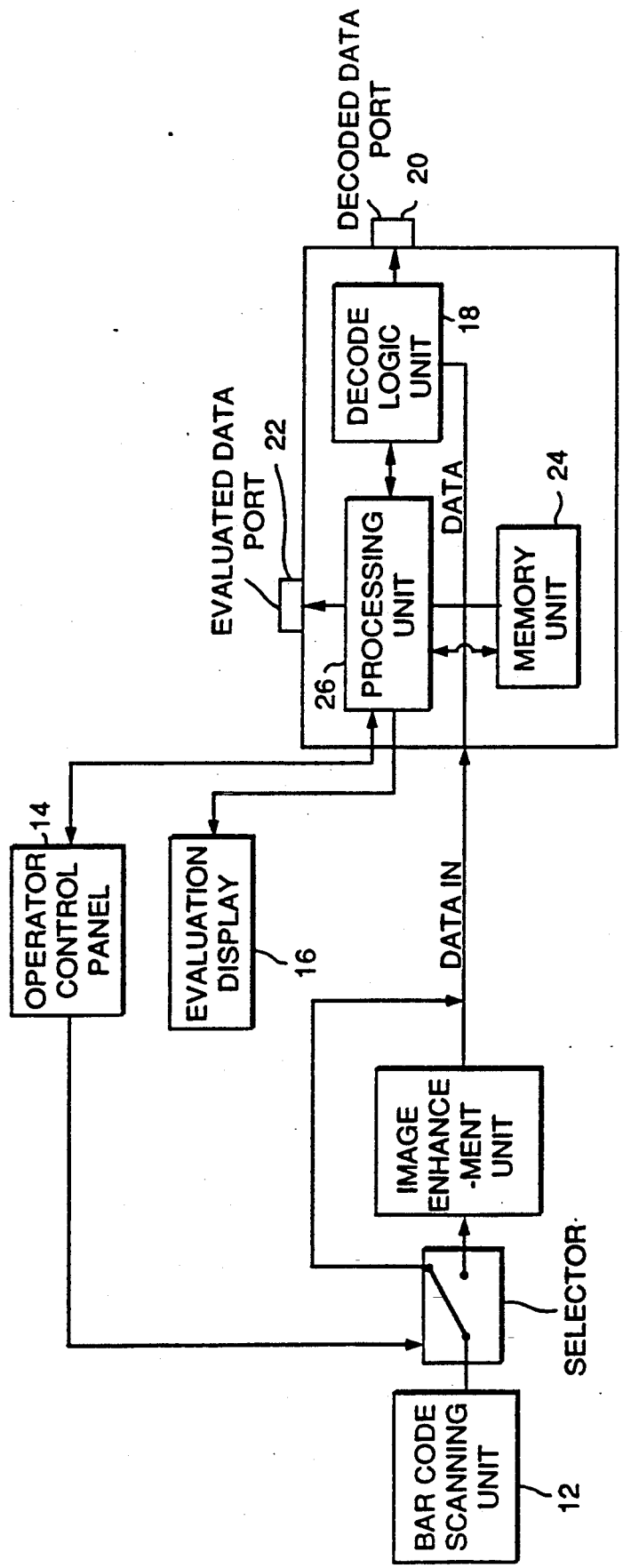
FIG. 5 is a schematic block diagram of a second embodiment of the invention.

It may also be desirable to include image enhancement processing of the digitized bar code data to reduce decoding errors. For example, in a further embodiment, the decode logic unit includes user selectable image enhancement processing circuitry for performing filtering and thresholding operations on the digitized bar code data, thereby improving the ability of the decode logic unit to decode the data. The evaluation routine is also modified to permit user selectability of the same image enhancement processing of the digitized image data prior to performing the evaluation routine. Thus, the evaluation routine can be performed on either the enhanced bar code data or digitized bar code data generated directly by the bar code scanning unit, which enables the operator to determine the effectiveness of the image enhancement processing. If desired, the image enhancement processing can also be incorporated in a separate unit as shown in FIG. 5, instead of being incorporated in the functions of the decode/evaluation unit 18.

Industrial Applicability

The invention can be incorporated in any type of bar code symbol decoding apparatus, but is particularly useful in apparatus that perform high speed bar code reading or systems in which a low decode error is required because multiple attempts at reading the bar code symbol are not acceptable, such as in high volume document scanning systems or conveyor monitoring systems.

What is claimed is:

1. A method of decoding and evaluating a bar code symbol comprising the steps of:
    scanning the bar code symbol with a bar code scanning unit to generate digitized bar code symbol data;
    supplying the digitized bar code symbol data to a decode logic unit;
    decoding the digitized bar code symbol data with the decode logic unit;
    generating an error signal when the digitized bar code symbol data cannot be decoded;
    displaying an error message on a display unit in response to the generation of an error signal;
    supplying the digitized bar code symbol data to an evaluation processing unit in response to the error message;
    performing an evaluation routine on the digitized bar code symbol data with the evaluation processing unit to compare preselected parameters of the bar code symbol data to prespecified grading criteria in order to determine and grade the quality of the bar code symbol; and
    displaying the results of the evaluation routine on the display unit.

2. A method of decoding and evaluating a bar code symbol as claimed in claim 1, wherein the step of decoding the digitized bar code data includes the step of generated decoded bar code data if the digitized bar code data can be successfully decoded, and supplying the decoded bar code data to a decoded bar code data port for external processing.

3. A method of decoding and evaluating a bar code symbol as claimed in claim 1, wherein the step of performing an evaluation routine includes generating evaluation data and supplying the evaluation data to an evaluation port for external processing.

4. A method of decoding and evaluating a bar code symbols located on objects comprising the steps of:
    a. transporting the objects past a bar code scanning unit;
    b. scanning the bar code symbol with the bar code scanning unit as the objects are moved past the bar code scanning unit to generate digitized bar code symbol data;
    c. supplying the digitized bar code symbol data to a decode logic unit and a memory unit;
    d. decoding the digitized bar code symbol data with the decode logic unit;
    e. generating an error signal when the digitized bar code symbol data cannot be decoded;
    f. displaying an error message on a display unit in response to the generation of an error signal;
    g. supplying the digitized bar code symbol data in the memory unit to an evaluation processing unit in response to the error message;
    h. performing an evaluation routine on the digitized bar code symbol data with the evaluation processing unit to compare preselected parameters of the bar code symbol data with prespecified grading criteria in order to determine and grade the quality of the bar code symbol; and
    i. displaying the results of the evaluation routine on the display unit.

* * * * *